April 2, 1940.  R. W. WAGNER  2,195,909
POWER TAKE-OFF ASSEMBLY
Original Filed May 16, 1938
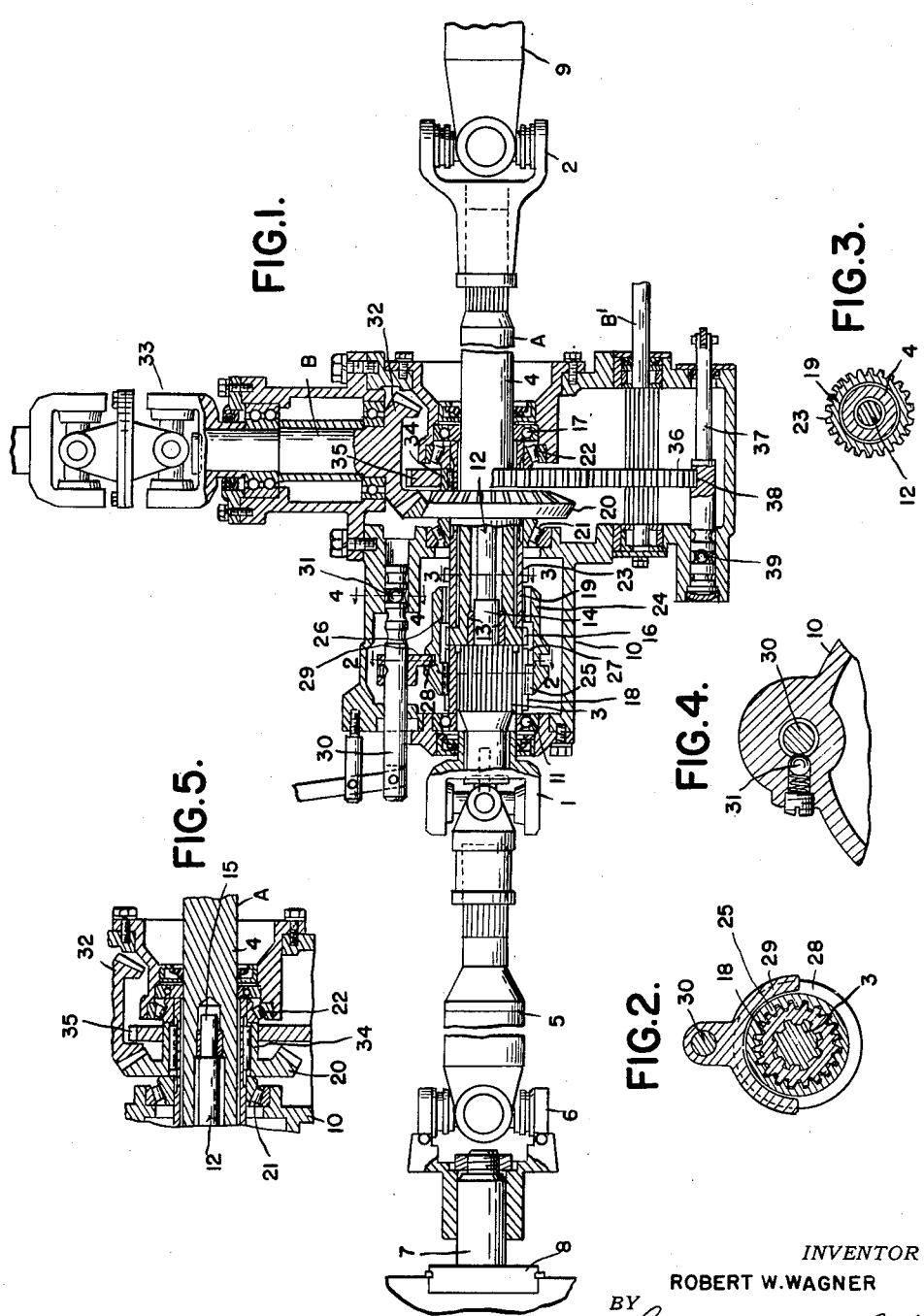
INVENTOR
ROBERT W. WAGNER
BY
*Whittemore, Hulbert & Belknap*
ATTORNEYS Patented Apr. 2, 1940

2,195,909

UNITED STATES PATENT OFFICE 2,195,909

POWER TAKE-OFF ASSEMBLY

Robert W. Wagner, Detroit, Mich., assignor to Detroit Harvester Company, Detroit, Mich., a corporation of Michigan Original application May 16, 1938, Serial No. 208,295. Divided and this application December 19, 1938, Serial No. 246,711

13 Claims. (Cl. 74—11)

This invention relates generally to power take-offs for motor vehicles such as a split propeller shaft power take-off assembly for trucks, and constitutes a division of my application filed May 16, 1938, bearing Serial No. 208,295.

One of the essential objects of the invention is to provide an assembly of this type wherein two power take-off shafts, one disposed substantially at right angles and one disposed substantially parallel to the propeller shaft, may be operatively connected to the propeller shaft so as to be driven therefrom.

Another object is to provide an assembly wherein the operation of such power take-off shafts may be conveniently controlled by suitable shifter mechanism.

Other objects, advantages and novel details of construction of this invention will be made more apparent as this description proceeds, especially when considered in connection with the accompanying drawing, wherein:

Figure 1 is a longitudinal horizontal sectional view through an assembly embodying my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is a fragmentary longitudinal section through a portion of Figure 1.

Referring now to the drawing, A is the propeller shaft, and B and B' are the power take-off shafts of an assembly embodying my invention.

As shown, the propeller shaft A extends between two universal joints 1 and 2, respectively, and has two sections 3 and 4. As usual, a shaft 5 extends forwardly from the universal joint 1 to another universal joint 6 connected to a shaft 7 projecting rearwardly from the transmission 8 of an internal combustion engine (not shown), while a shaft 9 extends rearwardly from the universal joint 2 to the pinion gear (not shown) of the rear axle assembly.

Preferably the propeller shaft drive section 3 is provided within a suitable housing 10 with ball bearings 11 and has a reduced stepped portion 12 that is received within and extends axially of the driven section 4. Needle bearings 13 are provided about the steps 14 and 15, respectively, of the drive section 3 within the driven section 4. The driven section 4 is provided at its forward end with an integral toothed clutch member 16 and is provided within the housing 10 with ball bearings 17.

Splined upon the drive section 3 between the ball bearings 11 and the clutch member 16 is a sleeve-type toothed clutch member 18, while freely rotatable upon the driven section 4 between the clutch member 16 and the ball bearings 17 is a power take-off sleeve 19 upon which is keyed a beveled gear 20. Encircling this sleeve 19 upon opposite sides of the bevel gear 20 are roller bearings 21 and 22, respectively, which cooperate with the ball bearings 11 and 17 to maintain the stepped portion 12 of the drive section 3 in proper axial relationship to the driven section 4. Thus, the stepped portion 12 of the drive section serves in effect as a pilot within the driven section 4. Preferably there is ample clearance between the driven section 4 and the power take-off sleeve 19 to compensate for any inaccuracies in machining which may occur and any misalignment in assembly. Thus, no binding between the parts will take place.

Formed integral with the power take-off sleeve 19 at a point between the clutch member 16 and roller bearings 21 is a toothed clutch member 23 which, like the clutch members 16 and 18, is adapted to be encircled by a sliding clutch collar 24. Preferably this sliding clutch collar 24 is provided interiorly thereof with integral toothed clutch members 25 and 26 and an intermediate channel or recess 27, and is provided exteriorly thereof with an annular groove or channel 28 which is engaged by a shifter fork 29 fixed upon a shaft 30 slidable longitudinally in the housing 10. As shown, the arrangement is such that clutch member 25 will always be in engagement with clutch member 18 and may be engaged with clutch member 16 while in engagement with clutch member 18. Clutch member 26 is adapted to be alternately engaged with clutch members 16 and 23. Any suitable means (not shown) may be employed from a remote point, for example, from the dash or instrument board of the truck, for sliding shaft 30 longitudinally to cause collar 24 to be shifted longitudinally to the right or left so that the engagement of gears described above may be effected, while any suitable means, such as the spring pressed balls 31, may be employed to retain the shaft 30 in adjusted position.

Formed integral with the inner end of the power take-off shaft B is a bevel gear 32 that meshes with the bevel gear 20 on the drive section 4 of the propeller shaft. At the outer end of the power take-off shaft B is a universal joint 33 to which a shaft for driving equipment or mechanism (not shown) may be connected.

Fixed upon the hub 34 of the bevel gear 20 is a spur gear 35 adapted to be engaged by a gear 36 splined on the power take-off shaft B'. A shaft 37 slidably mounted in the housing 10 and adapted to be operated from a remote point, for example, from the dash or instrument board of the truck, by suitable means (not shown) is employed for sliding the gear 36 on the power take-off shaft B' to and from engagement with the spur gear 35. As shown, shaft 37 has a recessed portion 38 straddling the periphery of gear 36 and is provided at one end with spaced annular grooves for the reception of a spring-pressed ball 39 in the housing to retain said shaft in adjusted position.

Thus, from the foregoing it will be apparent that the assembly shown in Figure 1 is in neutral position. When the clutch collar 24 is shifted from neutral to the left so that clutch members 26 and 16 are in engagement with each other, then the drive is transmitted from the drive section 3 through clutch members 18 and 25, collar 24 and clutch members 26 and 16 to the driven section 4 to propel the rear wheels (not shown) of the truck. In this position the power take-off shafts B and B' are idle. When the collar 24 is shifted from neutral position to the right so that clutch members 26 and 23 are in engagement with each other, then the drive is transmitted from the drive section 3 through clutch members 18 and 25, collar 24 and clutch members 26 and 23 to the power take-off sleeve 19, thence through the bevel gears 20 and 32 to the power take-off shaft B and through the bevel gear 20, hub 34, to the spur gear 35. In this position the power take-off shaft B is actuated only. If the gear 36 is shifted by the shaft 37 into mesh with the gear 35, then the power take-off shaft B' is also actuated. When this takes place, both shafts B and B' are actuated simultaneously by the bevel gear 20. When collar 24 is shifted further to the right from the power take-off drive position just mentioned so that clutch member 25 will engage with clutch member 16 while clutch member 25 is in engagement with clutch member 18, and clutch member 26 is in engagement with clutch member 23, then the drive is transmitted from drive section 3 through clutch members 18, 25 and 16 to the driven section 4 and through clutch members 18 and 25, collar 24 and clutch members 26 and 23 to the power take-off sleeve 19. Thus, in this position, both the rear wheels of the truck and the power take-off shaft B are operated simultaneously. If gear 36 is shifted by shaft 37 into mesh with gear 35 while the parts aforesaid are in the position mentioned, then the power take-off shaft B' is likewise operated simultaneously with power take-off shaft B and the rear wheels of the truck.

From the foregoing it will be apparent that my construction enables the rear wheels of the truck alone to be driven; enables the power take-off shaft B alone to be driven; enables the power take-off shaft B and power take-off shaft B' to be driven simultaneously; and enables the rear wheels of the truck and both power take-off shafts B and B' to be driven simultaneously.

What I claim as my invention is:

1. In a power take-off assembly, a propeller shaft, a power take-off shaft substantially parallel to said propeller shaft, a power take-off shaft extending at substantially right angles to said propeller shaft, means for driving the second mentioned power take-off shaft from the propeller shaft, and a driving connection between the propeller shaft and first mentioned power take-off shaft including a part of the means for driving the second mentioned power take-off shaft.

2. In a power take-off assembly, a propeller shaft, a power take-off shaft substantially parallel to said propeller shaft, a power take-off shaft extending at substantially right angles to said propeller shaft, means for driving the second mentioned power take-off shaft from the propeller shaft, and means operable by a part of the last mentioned means for driving the first mentioned power take-off shaft.

3. In a power take-off assembly, a propeller shaft having a drive section and a driven section, a power take-off shaft substantially parallel to said propeller shaft, a power take-off shaft extending at substantially right angles to said propeller shaft, driving connections between said drive section and driven section of the propeller shaft and between said propeller shaft and second mentioned power take-off shaft operable to drive the driven section of the propeller shaft and said second mentioned power take-off shaft simultaneously, and means operable by a part of the drive for the second mentioned power take-off shaft for driving the first mentioned power take-off shaft.

4. In a power take-off assembly, a propeller shaft having a drive section and a driven section, a power take-off shaft substantially parallel to said propeller shaft, a power take-off shaft extending at substantially right angles to said propeller shaft, driving connections between said drive section and driven section of the propeller shaft and between said propeller shaft and second mentioned power take-off shaft operable to drive the driven section of the propeller shaft and said second mentioned power take-off shaft simultaneously, a driving connection between the first mentioned power take-off shaft and the drive means for the second mentioned power take-off shaft, and means for controlling the last mentioned driving connection.

5. In a power take-off assembly, a propeller shaft having two sections, one being a drive section and the other a driven section, a clutch member fixed to the driven section, a clutch member splined on the drive section, a power take-off sleeve freely rotatable upon the driven section, a power take-off gear fixed to said sleeve, a clutch member fixed to said sleeve, a sliding collar encircling the first two mentioned clutch members and adapted to encircle the third mentioned clutch member, a clutch member rigid with said collar constantly in engagement with the second mentioned clutch member and adapted to engage with the first mentioned clutch member while in engagement with the second mentioned clutch member, another clutch member rigid with said collar adapted to alternately engage with the first and third mentioned clutch members, a power take-off shaft operatively connected to the power take-off gear, a gear rigid with the power take-off gear, a second power take-off shaft, and means for operatively connecting the second power take-off shaft to the last mentioned gear.

6. In a power take-off assembly, a propeller shaft, a power take-off shaft disposed at substantially right angles to said propeller shaft, a power take-off shaft disposed substantially parallel to said propeller shaft, a gear carried by the first mentioned power take-off shaft, a driving connection between said propeller shaft and first mentioned power take-off shaft including a gear meshing with the gear aforesaid, and a driving connection between the last mentioned gear and the second mentioned power take-off shaft.

7. In a power take-off assembly, a propeller shaft, a power take-off shaft disposed at substantially right angles to said propeller shaft, a power take-off shaft disposed substantially parallel to said propeller shaft, a gear carried by the first mentioned power take-off shaft, a driving connection between said propeller shaft and first mentioned power take-off shaft including a gear meshing with the gear aforesaid, and a driving connection between the last mentioned gear and second mentioned power take-off shaft including means operable to cause the second mentioned power take-off shaft to operate in unison with the first mentioned power take-off shaft or remain idle during operation thereof.

8. In a power take-off assembly, a propeller shaft, a power take-off shaft disposed at substantially right angles to said propeller shaft, a power take-off shaft disposed substantially parallel to said propeller shaft, a gear carried by the first mentioned power take-off shaft, a driving connection between said propeller shaft and first mentioned power take-off shaft including a gear meshing with the gear aforesaid, a gear operatively connected to the second mentioned gear, a gear splined upon the second mentioned power take-off shaft and adapted to mesh with the third mentioned gear, and shifter mechanism for the last mentioned gear.

9. In a power take-off assembly, a propeller shaft, a power take-off shaft disposed at substantially right angles to said propeller shaft, a power take-off shaft disposed substantially parallel to said propeller shaft, a bevel gear adapted to be driven by the propeller shaft and having a hub, a gear fixed to the hub of said bevel gear so that said gears operate in unison, means operable by the bevel gear for driving the first mentioned power take-off shaft, and means operable by the second mentioned gear for driving the second mentioned power take-off shaft.

10. In a power take-off assembly, a propeller shaft having a drive section and a driven section, a power take-off shaft disposed substantially at right angles to said propeller shaft, a power take-off shaft disposed substantially parallel to said propeller shaft, a bevel gear concentric with the driven section and adapted to be driven by the drive section of the propeller shaft, said bevel gear having a hub, a gear fixed to the hub of said bevel gear so that said gears operate in unison, means for driving the driven section from the drive section of the propeller shaft, means operable by the bevel gear for driving the first mentioned power take-off shaft, and means operable by the second mentioned gear for driving the second mentioned power take-off shaft.

11. In a power take-off assembly, a propeller shaft having a drive section and a driven section, a power take-off shaft disposed substantially at right angles to said propeller shaft, a power take-off shaft disposed substantially parallel to said propeller shaft, a power take-off sleeve freely rotatable on the driven section and adapted to be driven by the drive section, a bevel gear upon and rigid with said sleeve, said bevel gear having a hub, a gear fixed to the hub of said bevel gear so that said gears operate in unison, means for driving the driven section from the drive section of the propeller shaft, means operable by the bevel gear for driving the first mentioned power take-off shaft, and means operable by the second mentioned gear for driving the second mentioned power take-off shaft.

12. In a power take-off assembly, a propeller shaft, a power take-off shaft disposed at substantially right angles to said propeller shaft, a power take-off shaft disposed substantially parallel to the propeller shaft, means for driving one of said power take-off shafts from said propeller shaft, and means including a part of the means just mentioned for driving the other of said power take-off shafts.

13. In a power take-off assembly, a propeller shaft, a power take-off shaft substantially parallel to said propeller shaft, a power take-off shaft disposed at substantially right angles to the propeller shaft, means for driving one of said power take-off shafts from the propeller shaft, and means operable by a part of the drive means just mentioned for driving the other of said power take-off shafts.

ROBERT W. WAGNER.